Sept. 11, 1973   W. D. BOND ET AL   3,758,276
WATER-PROPELLED POOL PURIFYING FLOAT
Filed April 5, 1971   3 Sheets-Sheet 1
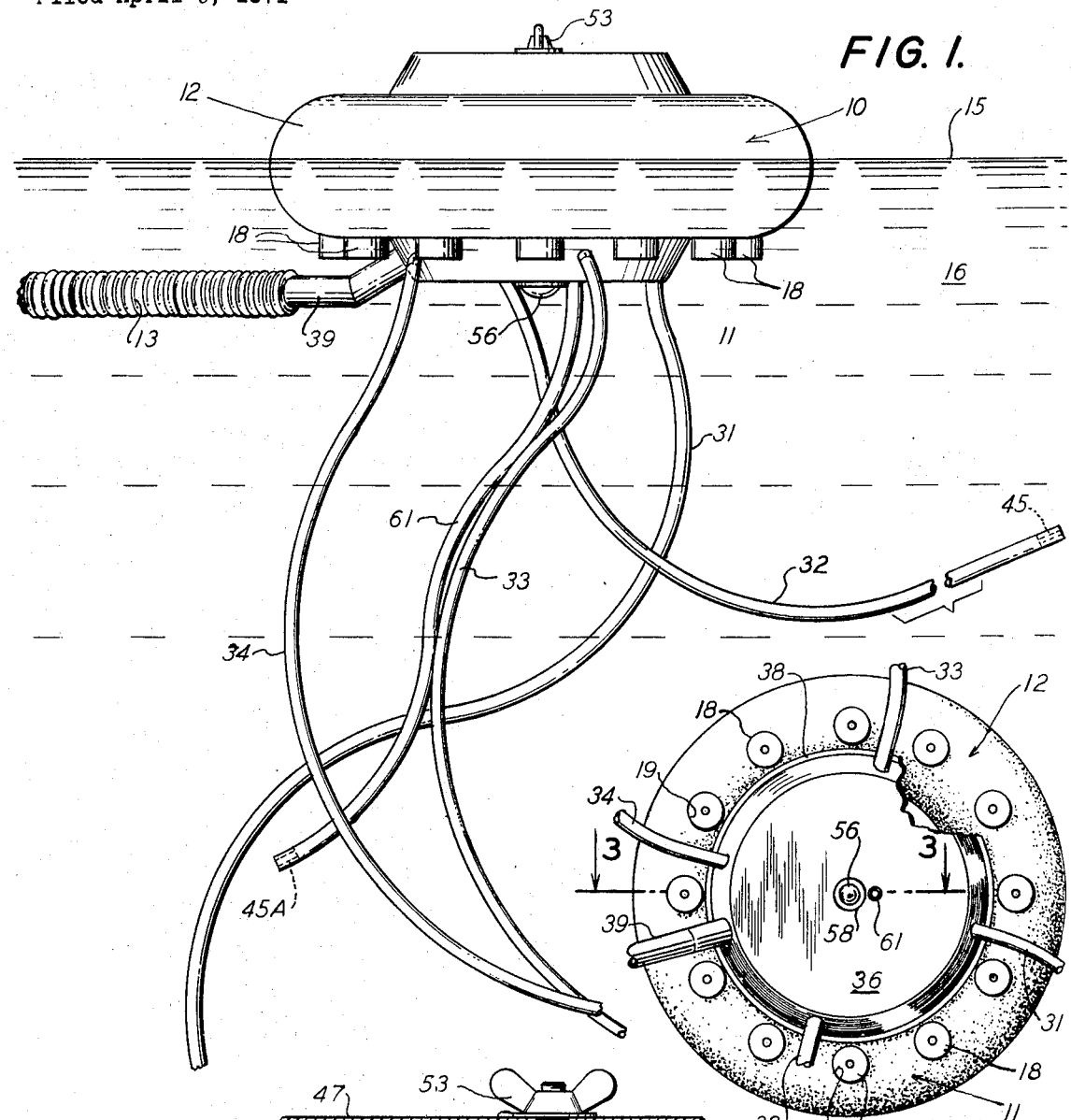
FIG. 1.
FIG. 2.
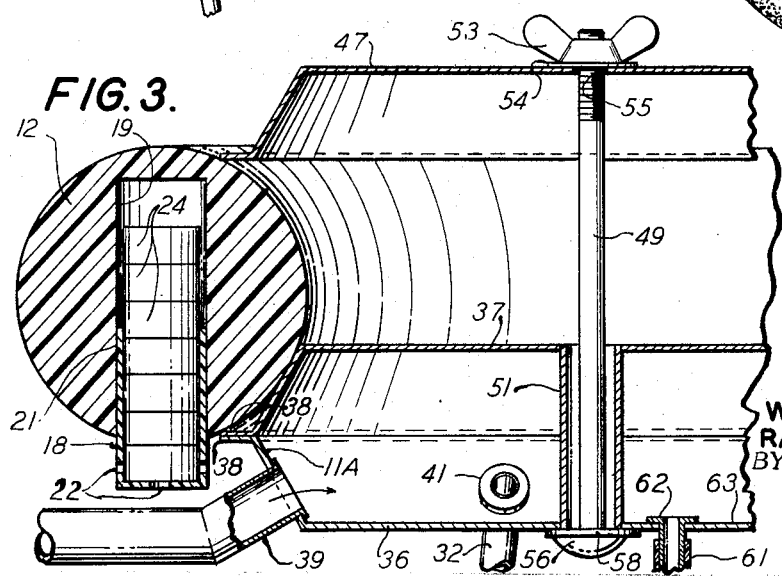
FIG. 3.
FIG. 4.
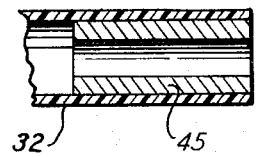
INVENTORS:
WILLIAM DANA BOND
RAY WESLEY PATTERSON
BY
W. J. Gribble
ATTORNEY

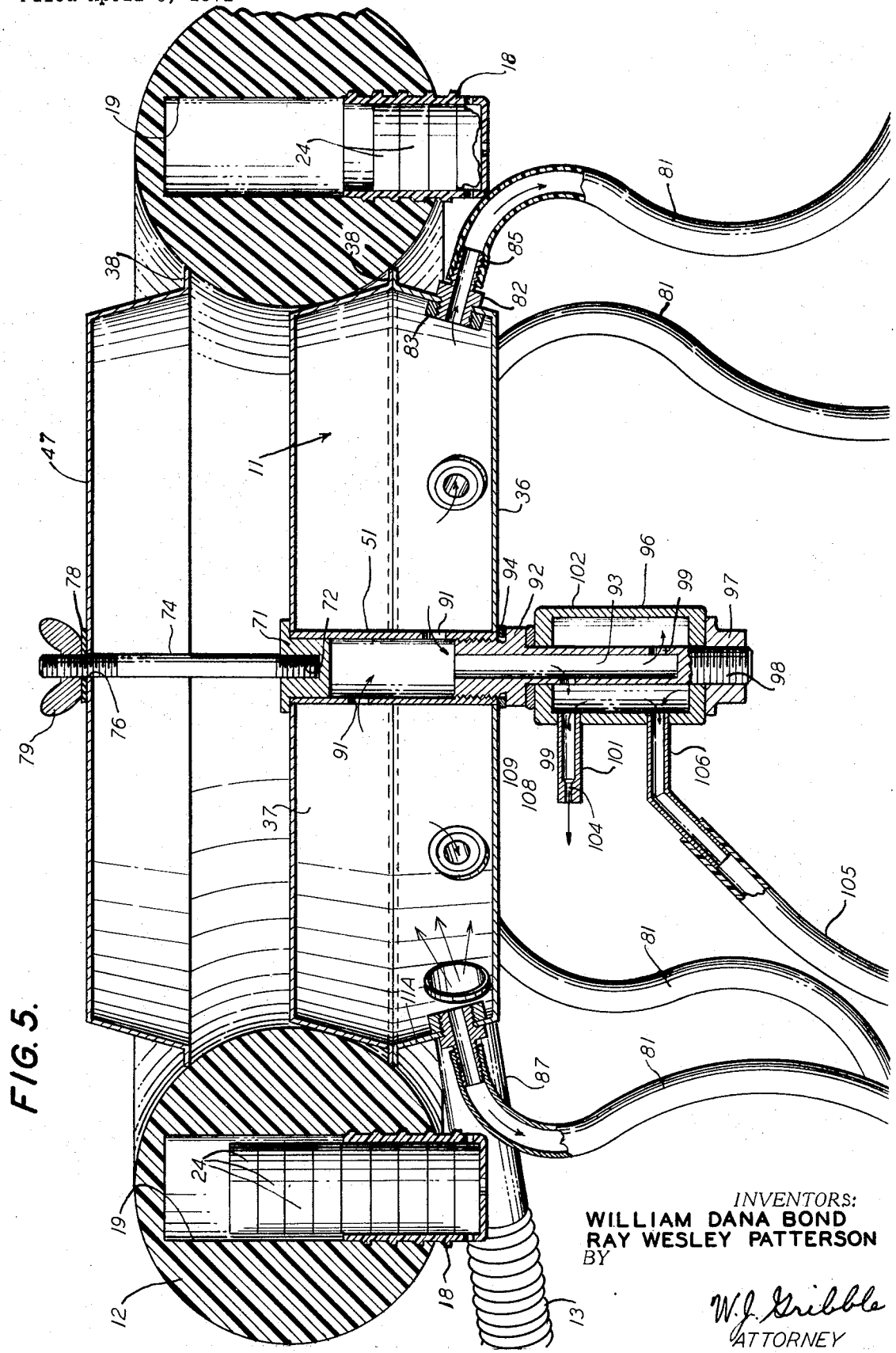

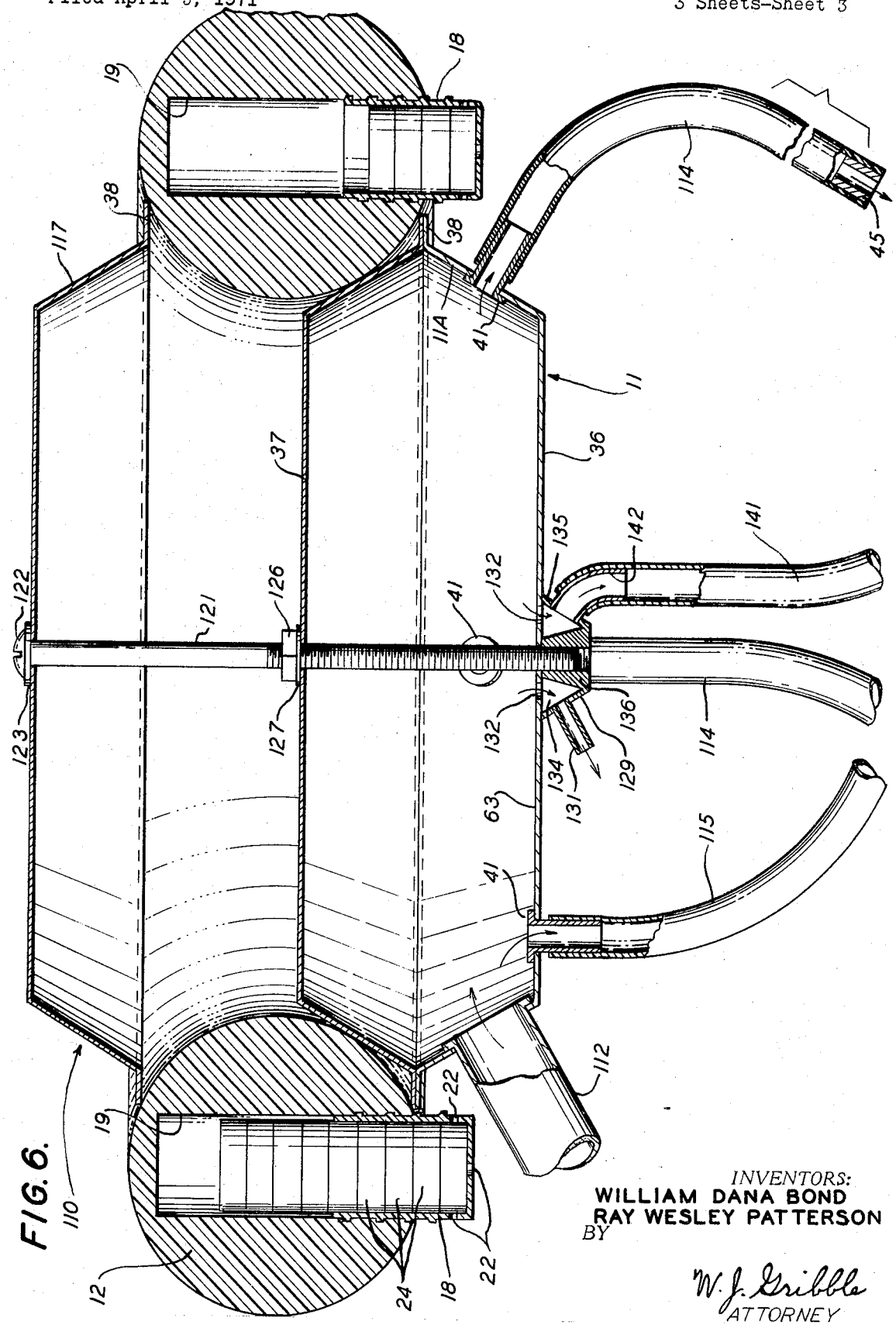

United States Patent Office

3,758,276
Patented Sept. 11, 1973

3,758,276
WATER-PROPELLED POOL PURIFYING FLOAT
Willilam D. Bond, 147 McKinley Place, Arcadia, Calif. 91016, and Ray Wesley Patterson, 22099 Waite, Elsinore, Calif. 92330
Filed Apr. 5, 1971, Ser. No. 131,250
Int. Cl. B01d *11/02;* B01f *1/00*
U.S. Cl. 23—267 A                                6 Claims

ABSTRACT OF THE DISCLOSURE

A foam plastic flotation ring containing a plurality of soluble chlorine capsules supports a pool water manifold into which return water from the pool circulation system flows from a long flexible hose linked to the pool return system. A plurality of flexible tube agitators extend from the manifold. The agitators whip randomly beneath the floating manifold to agitate sediment from the pool walls and bottom for removal through the pool drain. A jet extends from the manifold and reaction to the discharge of pool return water through the jet moves the chlorinator and agitators about the pool.

BACKGROUND OF THE INVENTION

The invention relates to swimming pool water treatment and cleaning devices. A flotation body with soluble chlorine capsules is disclosed in U.S. Letters Patent application Ser. No. 22,556 filed Mar. 25, 1970, now U.S. Pat. 3,677,711, William D. Bond, inventor. As disclosed in that application, the chlorine concentration level in a swimming pool must be maintained within certain limits in order to keep the pool free of algae and not increase to the chlorine concentration level harmful to swimmers. In addition to the chlorine problem foreign particles falling into the pool settle on the walls and bottom of the pool and remain in some areas because the pool recirculation system does not agitate the water sufficiently in all areas to float the sediment to the pool drain and thence to entrainment in the return line filter.

Many devices have been proposed to overcome these problems in swimming pool maintenance, many of great complication and initial cost. Conventionally, separate devices are employed to achieve the two functions of proper chlorination and removal of pool sediment. The present invention accomplishes the objectives of proper continuous chlorination and continuous removal of sediment in a single economical device, which may be used for either or both objectives.

SUMMARY OF THE INVENTION

The invention contemplates a water manifold with means connecting to the return line of the pool recirculation system and flotation means attached to the manifold, preferably with capsules of soluble chlorine contained within the flotation means. Tube agitators extend from the manifold and preferably each terminates in a reaction jet to cause random motion of the flexible tube agitator with respect to the floating manifold and the surrounding water. A secondary reaction jet extends from the center of the manifold and may have a lesser length than the tube agitators and a smaller reaction jet, tending to move the manifold and its flotation member about the surface of the water to agitate a large area. The chlorine dissolved from the capsules is also more uniformly distributed within the pool volume as the device moves about.

Preferably the manifold comprises like opposed concave discs attached to define a chamber. A similar concave disc rests on the top of the flotation ring and support means extends from the top disc through the manifold to support the manifold on the flotation body. Preferably the three discs are similar to lower cost of manufacture.

The invention aims to provide a combined floating chlorinator and sediment agitator to cleanse and keep hygienic the pool within which the device floats. A further object of the invention is to provide such a device in which the flotation means for the manifold contains capsules of soluble chlorine. Another object is to provide such a device in which the manifold and the manifold attachment means to the flotation means are comprised of similar concave discs.

These and other advantages of the invention are apparent from the following detailed description and drawing.

BRIEF DESCRIPTION OF THE DRAWING

FIG. 1 is an elevational view illustrating the device of the invention afloat in a pool;

FIG. 2 is a bottom plan view of the device of FIG. 1;

FIG. 3 is a fragmentary sectional elevation taken along line 3—3 of FIG. 2;

FIG. 4 is a fragmentary section of the discharge end of an agitator;

FIG. 5 is a fragmentary sectional elevation of an alternate embodiment of the invention; and FIG. 6 is a fragmentary sectional elevation of a further alternate embodiment of the invention.

In the various views like parts have been given like reference characters.

DESCRIPTION OF THE PREFERRED EMBODIMENTS

FIGS. 1–4 illustrate a preferred embodiment of a water-propelled pool purifying float 10 which comprises a water manifold 11 supported by a toroidal flotation body 12 and connected to the pool water circulation return line (not shown) through a long flexible hose 13. The purifying float rests upon the surface 15 of the pool 16 such that a plurality of chlorine capsules 18 on the body are exposed to the pool water.

As can be seen from FIG. 3, the flotation body 12 has a plurality of cylindrical cavities 19 each of which contains a capsule 18. Each capsule comprises a hollow shell 21 having a plurality of bottom apertures 22 through which pool water enters and exits the shell to contact and dissolve a plurality of soluble chlorine tablets 24 held in the cavity 19 by the shell 21.

The flotation body of the embodiment of FIGS. 1–4 is preferably of foam plastic and has twelve downwardly opening cavities 19. One to twelve of the cavities may be filled with chlorine capsules in accordance with the chlorine demands of the particular pool. The body may have more or less than twelve cavities.

It is desirable to distribute the chlorine within the body of pool water. Some water circulation is achieved in conventional pools by the turbulence or the direction of the water emerging from the recirculation return line. In order to achieve greater chlorine distribution the embodiment of FIG. 1 moves randomly about the body of water in reaction to the recirculation water from hose 13 exiting manifold 11, as set forth below.

In addition to purifying the pool water through the addition of chlorine under controlled conditions, the embodiment of FIG. 1 aids in suspending foreign particles in the pool water while the water gradually flows to the pool drain from which the foreign particles are carried to the filter and entrapped. The agitation is accomplished by means of a plurality of long tube agitators 31, 32, 33, 34, each of which extends from the slanting frusto-conical side wall 11A of a manifold bottom concave disc 36. The manifold further comprises a top concave disc 37. The top and bottom discs, which similar, are opposed in orientation and joined at their flanges 38 to define the water manifold. Return water hose 13 discharges water into the manifold chamber defined by the upper and lower discs through a rigid conduit 39 fixed in the side wall 11A, of the bottom disc.

The elongate tube agitators may be connected volumetrically to the manifold in many different ways. The illustrative embodiment has the agitators connected by means of hollow spindles 41 which extend through the side wall 11A and are cemented or otherwise fixed to the side wall in leakproof fashion.

Each tube agitator is thus fixed at one end for flow from the manifold and free to agitate throughout its length, which may be fifteen feet. Preferably each tube agitator terminates in a jet restriction 45, as shown in FIG. 4. The restriction increases the velocity of the water emerging from the agitator and results in greater agitation on the part of the agitator within the pool body.

The manifold 11 is secured to the flotation body 12 by a third concave disc 47 which functions as a spider in contact with the toroid of the body and supports the manifold at the bottom of the body by means of a bolt 49 which passes through a central sleeve 51 of the manifold and is secured at the third disc by conventional means, such as a wing nut 53. Preferably sleeve 51 is fixed to both discs of the manifold. The wing nut compresses a gasket 54 about an aperture 55 of the third disc to preclude entry of water into the volume, between the third disc and the top disc 37 of the manifold. The head 56 of bolt 49 compresses a sealing washer 58 to seal sleeve 51 against the entry of water through the bottom disc.

It is desirable that the manifold be separable from the the toroidal flotation body 12 since the latter is preferably a disposable unit which is thrown away when the chlorine capsules have been completely dissolved or exhausted. Therefore wing nut 53 may be removed from bolt 49, releasing the third disc and the water manifold from the flotation body when it has served its purpose. The manifold and the support third disc may be then secured to a fresh chlorinator flotation body without detaching the manifold from water line 13, and the entire assembly may be replaced in the pool water.

In addition to the long tube agitators 31–34, a short tube agitator 61 extends from an attachment spool 62 which passes through a bottom wall 63 of bottom disc 36 of the water manifold. Preferably the agitator 61 connects to the manifold near the center thereof. The short agitator functions as a reaction jet to impose a reaction load upon the water manifold and the flotation body to move the water purifying float 10 about the surface of the pool water. Some motion is imposed upon the float by the action of the long tube agitators 31–35 but their motion is quite random and most of the reaction forces from the emerging water jet of the long tube agitators are absorbed through the 15-foot length of the agitator. In order to impose more of the force of reaction upon the float, tube agitator 61 is not only shortened, say to a length of four feet, but a restriction jet 45A (shown in dotted lines in FIG. 1) in the agitator 61 is more restrictive than the jets 45 of the long agitators. The lesser agitator length absorbs less of the jet reaction and the greater restriction of the jet results in a higher water velocity which also increases the reaction force upon the float 10.

The internal diameter of the agitators may be ⅜" where plastic tubing is used for the agitator. Four long agitators, each restricted to a 5/32" emerging jet, have been found to supply sufficient agitation, when supported by a 16" O.D. float body to keep suspended most of the wall land bottom sediment within the pool water until it can be removed through the pool bottom drain. The motion of the water purifying float about the pool has been satisfactory if the short tube agitator is no longer than about four feet and its ⅜" internal diameter further restricted by a ⅛" diameter exit jet. Naturally the motion of the water purifying float depends in part upon the amount of water delivered by the recirculation return line to the water manifold of the float. A flexible hose having an inside diameter of ¾" to 1" has been found to supply sufficient motion both of the float and of the agitators in the conventional sized swimming pool.

It is not necessary that all of the return water be directed to the manifold of the water purifying float and arrangements and proportions of the return line water so directed will depend upon the size of the pool and the pressure of the return line flow, both of which may vary greatly.

In the embodiment of FIG. 5 a toroidal float body 12 has a plurality of apertured cylindrical shells 18 in downwardly opening cylindrical cavities 19. Each shell contains a plurality of soluble tablets 24 of water-treatment material, such as chlorine.

The flotation body supports a water manifold 11 which comprises a bottom concave disc 36 and a top concave disc 37. The discs are oppositely oriented to define a manifold chamber and are joined at their flange 38 and further secured by a central cylindrical sleeve 51.

The central sleeve has a flanged plug 71 with an internal thread 72. A support rod 74, threaded on both ends, engages plug 71. Rod 74 passes through an aperture 76 of a third concave disc 47 which acts as a support spider for the manifold 11. Disc 47 is substantially identical to the discs 36, 37 of the water manifold and its flange 38 makes contact with the periphery of toroidal flotation body 12 in sealing relationship. The volume between the discs 47 and 37 is further sealed against entry of pool water by a gasket 78 which is compressed by a wing nut 79 on the end of support rod 74.

When wing nut 79 is tightened, rod 74 draws the water manifold and the spider into contact with the flotation body and maintains the manifold in place thereon. The manifold may be simply removed from the flotation body when the chlorine capsules of the body are exhausted by removing wing nut 79 and separating the manifold and the spider disc.

As set forth with respect to the previously described embodiment, it is desirable not only to maintain the proper chlorine level within the body of pool water, but also to agitate sediment so that it may be carried from the pool surfaces to the pool drain. Therefore, a plurality of tube agitators 81 depend from the water manifold, each tube agitator being secured to the manifold by a threaded flanged sleeve 82 and a nut 83 within the manifold. The sleeve has a protruding threaded portion 85 which frictionally engages the internal wall of the tube agitator 81.

Like the previously described embodiment, the tube agitators 81 of the embodiment of FIG. 5 may be of 38" I.D. flexible tubing and be ten to fifteen feet in length. Water to flow through and agitate the agitators is supplied from a flexible hose 13 which connects to a rigid conduit 87 secured in the slanting wall 11A of the bottom concave disc.

The recirculating return water entering the manifold from flexible hose 13 is also used to propel the purifying water float about the pool surface. Central sleeve 51 has a plurality of entry ports 91 through which returning water may flow into a hollow stem 92 through its inner bore 93. Stem 92 is threadably engaged with the interior of central sleeve 51 and may have a gasket 94 sealing the threaded connection against leaks.

A hollow body 96 is maintained on the hollow stem by an internally threaded nut 97 which threadably engages the threaded end 98 of the stem. A plurality of outlet ports 99 on the stem distribute return water into the hollow body.

A jet pipe 101 extends through a wall 102 of the hollow body near its top. The pipe has a restrictive orifice 104 at its discharge end. The reactive force from the high velocity water discharge through orifice 104 tends to propel the flotation body and the manifold about the surface of the pool. Further propulsion may be obtained through a tube agitator 105 which connects to the hollow body through a rigid elbow 106 near the bottom of the hollow body. Agitator 105 may be shorter than the agitators 81 and have a high velocity jet restriction at its lower termination. Alternatively, the agitator 105 may be of considerable length and be effective in agitation because of the swivel action of the hollow body about the stem. The stem has a low friction washer 108 between the top of the body and the flange 109 of the hollow stem. The hollow body is thus free to respond to unequal reactions from the jet 104 and the agitator 105 and revolve about the stem 92.

FIG. 6 illustrates a further alternate embodiment of the invention wherein a water purifying float 110 has a flotation body 12 which may be of foam plastic. The flotation body contains a plurality of hollow cylindrical shells 18 in a plurality of body cavities 19. Each shell has a plurality of water soluble chemical tablets 24. The tablets may be of soluble chlorine or other water treatment chemicals.

As in the previous embodiments, the water purifying float of FIG. 6 includes a water manifold 11 connecting to the pool return line through a flexible hose (not shown) and a rigid conduit 112 opening into the volume defined by the oppositely oriented concave discs 36, 37 which are joined at their flanges 38 to define the water manifold. A plurality of tube agitators, such as the agitators 114 of FIG. 6, is secured to the slanting wall 11A of the bottom manifold disc by flanged sleeves 41. Another tube agitator 115 is secured to the bottom wall 63 of the bottom disc by a sleeve 41. The agitators 114 and 115 are ten to fifteen feet in length and of a flexible material, such as polyethylene plastic, so that they are free to respond to the flow of water from conduit 112 and the motion of the purifying float on the pool surface.

A support spider 117, which may be a third concave disc, similar in configuration to the discs 36 and 37, supports the water manifold, holding it against the flotation body. The flange 38 of the disc seats also against the periphery of the toroidal flotation body. The spider 117 receives an elongate bolt 121 with a head 122 in contact with a sealing washer 123 on the exterior of the third disc. The discs of the manifold, in addition to being secured together at their flanges 38, are held in orientation between a stop nut 126 bearing on a sealing washer 127 on top disc 37 and a hollow nut 129 bearing on the exterior wall 633 of bottom disc 36. In addition to securing the discs 36, 37, nut 129 has an extending jet pipe 131 which receives return water from the manifold through a plurality of disc apertures 132 and an annulus 134 in the nut. The annulus is defined by sloping outside walls 135 and a frusto conical interior boss 136 of the nut. Bolt 121 is threadably engaged with the boss 136.

The purifying float 110 of the embodiment of FIG. 6, like the previous embodiments, utilizes the force of the return water from the pool recirculation system to agitate the tube agitators and to propel the float about the pool surface. An agitator 141 may be secured by an elbow 142 to the hollow nut 129 such that an additional agitator depends from the central portion of the water manifold. The embodiment of FIG. 6 can be easily disassembled to replace the chemically exhausted flotation body by disengaging bolt 121 from hollow nut 129. The bolt may then be removed from the water manifold, freeing the flotation body therefrom.

Modifications within the scope of the invention, other than those shown by the illustrative embodiments, may occur to those skilled in the art. It is therefore desired that the invention be measured by the appended claims rather than by the illustrative embodiments shown and described herein.

We claim:
1. A pool water cleaner and chlorinator comprising a tank which is devoid of interior apparatus and functions as a manifold, a water inlet to said tank and a plurality of first water outlets from said tank, a plurality of elongated tube agitators to agitate the sediment in the pool connected to and extending downwardly from said outlets, a second water outlet and means connected to said second outlet for functioning as a reaction jet to move said tank about on the surface of said pool water when the device is in use and a means for supporting said tank on the surface of said pool water comprising an annular float surrounding said tank and detachably secured thereto, said float having a plurality of circumferentially spaced cavities therein for receiving chlorine tablets in liquid communication with the pool water, said tank bearing on the inner lower portion of said annular float, said annular float being secured to said tank by means comprising a disc covering said tank and bearing on the upper inner portion of said float and connected to said tank by a screw bolt and nut, to thereby prevent entry of water into the volumn defined by the disc, float and top of the tank.

2. A pool water cleaner and chlorinator as claimed in claim 1 wherein said means functioning as a reaction jet comprises an elongated tube which is substantially shorter than said elongated tube agitators.

3. A pool water cleaner and chlorinator as claimed in claim 1 wherein said means functioning as a reaction jet comprises a jet pipe connected to swivel means and adapted to discharge water horizontally in different directions relative to said tank.

4. A pool water cleaner and chlorinator as claimed in claim 3 wherein said swivel means comprises a hollow body which swivels about a stem means connected to said tank, and an elongated tube agitator is also connected to said hollow body.

5. A pool water cleaner and chlorinator as claimed in claim 4 wherein said stem is hollow and has upper and lower threaded portions, the upper portion engaging the tank and the lower portion engaging a nut, said stem being in communication with said second outlet of said tank and with said hollow body.

6. A pool water cleaner and chlorinator as claimed in claim 1 wherein the means functioning as a reaction jet comprises a pipe connected to said nut includes a water passage in communication with said second water outlet and said pipe.

References Cited
UNITED STATES PATENTS

| | | | |
|---|---|---|---|
| 3,677,711 | 7/1972 | Bond | 23—267 A |
| 3,684,460 | 8/1972 | Arneson | 3—267 A |
| 3,291,145 | 12/1966 | Arneson | 15—1.7 |
| 3,483,989 | 12/1969 | Gopstein | 23—267 A |
| 3,598,536 | 8/1971 | Christensen | 23—267 E |
| 3,202,322 | 8/1965 | Cleary | 23—267 A |
| 2,826,484 | 3/1958 | Buehler | 23—267 A |
| 2,976,129 | 3/1961 | Buehler | 23—267 A |
| 3,139,099 | 6/1964 | Anthony | 15—1.7 |
| 3,392,738 | 7/1968 | Pansini | 15—1.7 |
| 3,265,079 | 8/1966 | Blumenfield | 15—1.7 |
| 3,032,044 | 5/1962 | Pansini | 15—1.7 |
| 3,170,180 | 2/1965 | Winston | 15—1.7 |

NORMAN YUDKOFF, Primary Examiner

S. J. EMERY, Assistant Examiner

U.S. Cl. X.R.

23—267 E; 210—169, 242; 15—1.7